(12) United States Patent
Choi

(10) Patent No.: US 11,103,077 B2
(45) Date of Patent: Aug. 31, 2021

(54) ADJUSTABLE SUPPORT AND BEDSTEAD HAVING SAME

(71) Applicant: Inno-Sports Co., Ltd., Xiamen (CN)

(72) Inventor: Kwan Jun Choi, Xiamen (CN)

(73) Assignee: Inno-Sports Co., Ltd., Xiamen (CN)

( * ) Notice: Subject to any disclaimer, the term of this patent is extended or adjusted under 35 U.S.C. 154(b) by 234 days.

(21) Appl. No.: 15/946,542

(22) Filed: Apr. 5, 2018

(65) Prior Publication Data

US 2019/0029435 A1    Jan. 31, 2019

(30) Foreign Application Priority Data

Jul. 26, 2017   (CN) ......................... 201720914029.X

(51) Int. Cl.
*A47C 19/12*      (2006.01)
*A47C 19/02*      (2006.01)
*A47C 19/04*      (2006.01)

(52) U.S. Cl.
CPC .......... *A47C 19/128* (2013.01); *A47C 19/024* (2013.01); *A47C 19/04* (2013.01); *F16M 2200/02* (2013.01)

(58) Field of Classification Search
CPC ..... A47C 19/128; A47C 19/024; A47C 19/04; A47C 19/12; F16M 2200/02; E04H 15/46; E04H 15/60; F16B 12/04; A47B 3/002; A47B 9/06; E05B 15/0046; A47D 13/06; E05C 9/042; E05C 21/00; E05C 11/00; E05C 1/00; E05C 1/0022; E05C 17/30; Y10T 70/10
USPC ....................................................... 292/262
See application file for complete search history.

(56) References Cited

U.S. PATENT DOCUMENTS

| | | | |
|---|---|---|---|
| 202,685 A | 4/1878 | White | |
| 324,843 A | 8/1885 | Horton | |
| 337,415 A | 3/1886 | McKeough | |
| 893,364 A | 7/1908 | Piaser | |
| 1,196,253 A | 8/1916 | Lovvy | |
| 1,599,971 A * | 9/1926 | Melson | E05C 17/30 292/265 |

(Continued)

FOREIGN PATENT DOCUMENTS

| | | |
|---|---|---|
| CN | 204336376 U | 5/2015 |
| CN | 204336377 U | 5/2015 |
| GB | 810195 A | 3/1959 |

OTHER PUBLICATIONS

U.S. Appl. No. 15/144,597, filed May 2, 2016.

(Continued)

*Primary Examiner* — Eric J Kurilla
*Assistant Examiner* — James T Coble
(74) *Attorney, Agent, or Firm* — Morgan, Lewis & Bockius LLP

(57) ABSTRACT

Disclosed are adjustable supports and bedsteads. An adjustable support includes an inner bar with one or more cuts and an outer tubular bar with a slot. The inner and outer bars are movably coupled with each other. The adjustable support also includes a mechanism coupled with the outer bar at a position corresponding to the slot of the outer bar. When a cut of the inner bar is aligned with the slot of the outer bar, the mechanism engages with both the cut of the inner bar and the slot of the outer bar, and thus restricts the inner and outer bars from moving with respect to each other.

20 Claims, 5 Drawing Sheets

(56) References Cited

U.S. PATENT DOCUMENTS

| | | | |
|---|---|---|---|
| 6,062,589 A | 5/2000 | Cheng | |
| 6,223,628 B1 | 5/2001 | Barron | |
| 6,575,656 B2 | 6/2003 | Suh | |
| 6,938,927 B1 | 9/2005 | Martin | |
| 7,066,676 B2 | 6/2006 | Tsai | |
| 7,144,078 B2 | 12/2006 | Hsieh | |
| 7,849,867 B2 | 12/2010 | Takayama | |
| 7,874,303 B2 | 1/2011 | Xie | |
| 8,806,677 B1 | 8/2014 | Bartelsmeyer | |
| 8,888,123 B1 | 11/2014 | Cheng | |
| 9,027,952 B2 | 5/2015 | Zhu | |
| 9,248,072 B2 | 2/2016 | Wu | |
| 9,456,698 B2 | 10/2016 | Oh | |
| 9,895,003 B2 | 2/2018 | Choi | |
| 10,123,629 B2 | 11/2018 | Choi | |
| 10,125,801 B2 | 11/2018 | Wilson | |
| 10,285,506 B2 | 5/2019 | Choi | |
| 2003/0009848 A1* | 1/2003 | Kuo | A45C 13/262 16/113.1 |
| 2006/0062632 A1 | 3/2006 | Jang | |
| 2007/0012346 A1 | 1/2007 | Choi | |
| 2011/0099712 A1 | 5/2011 | Jin | |
| 2012/0222216 A1 | 9/2012 | Jin | |
| 2013/0276228 A1 | 10/2013 | Hsieh | |
| 2015/0130250 A1* | 5/2015 | Masunaga | A47C 7/54 297/411.36 |
| 2015/0320225 A1 | 11/2015 | Boyd | |
| 2015/0327684 A1 | 11/2015 | Lee | |
| 2016/0157620 A1* | 6/2016 | Oh | A47C 19/024 5/312 |
| 2018/0110339 A1 | 4/2018 | Moon | |
| 2018/0192778 A1 | 7/2018 | Choi | |
| 2018/0271296 A1 | 9/2018 | Harrow | |
| 2018/0332973 A1 | 11/2018 | Choi | |
| 2019/0029435 A1 | 1/2019 | Choi | |
| 2019/0045938 A1 | 2/2019 | Skaggs | |

OTHER PUBLICATIONS

U.S. Appl. No. 15/389,298, filed Dec. 22, 2016.
U.S. Appl. No. 15/400,861, filed Jan. 6, 2017.
U.S. Appl. No. 15/600,581, filed May 19, 2017.
U.S. Appl. No. 15/423,055, filed Feb. 2, 2017, now U.S. Pat. No. 9,895,003.
U.S. Appl. No. 15/423,161, filed Feb. 2, 2017.

* cited by examiner

ADJUSTABLE SUPPORT AND BEDSTEAD HAVING SAME

CROSS-REFERENCE TO RELATED APPLICATIONS

The present application claims priority to Chinese Utility Model Application CN 201720914029.X filed Jul. 26, 2017. The disclosure of the application is incorporated herein for all purposes by reference in its entirety.

FIELD OF THE INVENTION

The present invention generally relates adjustable supports and bedsteads having such adjustable supports.

BACKGROUND

A bedstead with foldable legs generally includes a bed frame and legs pivotally connected to and supporting the bed frame. To stabilize the bedstead, legs are usually connected with each other by lateral bars, and lateral bars are connected to the bed frames by supports. In some existing bedsteads, supports are short bars or struts directly fastened to the lateral bars and the bed frames. In some other existing bedsteads, supports are adjustable with complex locking/unlocking mechanisms.

Given the current state of the art, there remains a need for adjustable supports and bedsteads that address the above-mentioned issues.

The information disclosed in this Background section is provided for an understanding of the general background of the invention and is not an acknowledgement or suggestion that this information forms part of the prior art already known to a person skilled in the art.

SUMMARY OF THE INVENTION

The present invention provides adjustable supports and bedsteads that are stable and easy to use.

In various embodiments, the present invention provides an adjustable support including an outer tubular bar, an inner bar, and a locking/unlocking mechanism. The outer tubular bar includes a first end, a second end, and a slot between the first and second ends of the outer tubular bar. The inner bar is slidably coupled with the outer tubular bar, and includes a first end, a second end, and a first cut between the first and second ends of the inner bar. The first end of the inner bar is inserted into the outer tubular bar through the second end of the outer tubular bar. The locking/unlocking mechanism includes a retainer, an elastic member and a fastener. The retainer includes a groove with an opening to receive the outer tubular bar. When assembled, a portion of the retainer adjacent the opening of the groove is aligned with the slot of the outer tubular bar. The elastic member is disposed at a bottom of the groove of the retainer, and abuts the outer tubular bar to push the outer tubular bar away from the retainer. The fastener is fixedly coupled with the portion of the retainer adjacent the opening of the groove. When assembled, a stem portion of the fastener is disposed at the slot of the outer tubular bar and crosses the outer tubular bar such that when the first cut of the inner bar aligns with the slot of the outer tubular bar, the stem portion of the fastener seats at the first cut of the inner bar and the slot of the outer tubular bar, thereby restricting the inner bar and the outer tubular bar from moving with respect to each other.

In some exemplary embodiments, the inner bar includes a second cut between the first end and the first cut of the inner bar. When the second cut of the inner bar aligns with the slot of the outer tubular, the stem portion of the fastener seats at the second cut of the inner bar and the slot of the outer tubular bar, thereby restricting the inner bar from moving with respect to the outer tubular bar.

In an exemplary embodiment, the retainer of the locking/unlocking mechanism includes a protrusion at a bottom of the retainer to hold the elastic member.

In an exemplary embodiment, the retainer has a substantially U-shape cross section.

In some exemplary embodiments, the outer tubular bar has a substantially oblong cross section, and the inner bar has a substantially rectangular cross section.

In an exemplary embodiment, the slot of the outer tubular bar is formed at a position proximal to the second end of the outer tubular bar.

In some exemplary embodiments, the fastener includes a bolt, a pin, a latch, a shaft, or a bar.

In some exemplary embodiments, the adjustable support further includes a guide coupled with the second end of the outer tubular bar to guide insertion of the inner bar into the outer tubular bar or movement of the inner bar with respect to the outer tubular bar. In an exemplary embodiment, the guide includes an opening with a cross section shaped substantially the same as a cross section of the inner bar. The guide also includes one or more elastic pieces, each with a retention to fit with a hole formed at or adjacent the second end of the outer tubular bar.

In various embodiments, the present invention provides a bedstead including a bed frame, a leg assembly pivotally connected with the bed frame, and one or more adjustable supports of the present invention disclosed herein. Each adjustable support has one end (either the first end of the outer tubular bar or the second end of the inner bar) pivotally connected with the bed frame, and the other end pivotally connected with the leg assembly. When a cut of the inner bar aligns with the slot of the outer tubular bar, the stem portion of the fastener seats at the cut of the inner bar and the slot of the outer tubular bar. As such, the fastener restricts the inner bar and the outer tubular bar from moving with respect to each other and accordingly restricts the leg assembly and the bed frame from rotating with respect to each other.

In some exemplary embodiments, the inner bar of each adjustable support includes a first cut. When the first cut of the inner bar aligns with the slot of the outer tubular, the leg assembly is unfolded with respect to the bed frame. In some exemplary embodiments, the inner bar of each adjustable support includes a second cut. When the second cut of the inner bar aligns with the slot of the outer tubular, the leg assembly is folded onto the bed frame.

In an exemplary embodiment, the first end of the outer tubular bar is pivotally connected with the bed frame, and the second end of the inner bar is pivotally connected with the leg assembly.

The adjustable supports and bedsteads of the present invention have other features and advantages that will be apparent from, or are set forth in more detail in, the accompanying drawings, which are incorporated herein, and the following Detailed Description, which together serve to explain certain principles of exemplary embodiments of the present invention.

BRIEF DESCRIPTION OF THE DRAWINGS

The accompanying drawings, which are incorporated into and constitute a part of this specification, illustrate one or more embodiments of the present invention and, together with the Detailed Description, serve to explain the principles and implementations of exemplary embodiments of the invention.

DETAILED DESCRIPTION

Reference will now be made in detail to implementations of the exemplary embodiments of the present invention as illustrated in the accompanying drawings. The same reference indicators will be used throughout the drawings and the following detailed description to refer to the same or like parts. Those of ordinary skill in the art will understand that the following detailed description is illustrative only and is not intended to be in any way limiting. Other embodiments of the present invention will readily suggest themselves to such skilled persons having benefit of this disclosure.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Many modifications and variations of the embodiments set forth in this disclosure can be made without departing from their spirit and scope, as will be apparent to those skilled in the art. The specific embodiments described herein are offered by way of example only, and the disclosure is to be limited only by the terms of the appended claims, along with the full scope of equivalents to which such claims are entitled.

Exemplary embodiments of the present invention are described in the context of adjustable supports and the use of adjustable supports in bedsteads. Generally, an adjustable support of the present invention includes an inner bar, an outer tubular bar, and a locking/unlocking mechanism. The inner and outer bars are movably coupled to each other, with a portion of the inner bar being inserted into the outer tubular bar. The locking/unlocking mechanism is configured to selectively restrict the inner bar and the outer tubular bar from moving with respect to each other when the inner and outer bars are placed at one or more specific positions. Adjustable supports of the present invention can be used to selectively restrict movement of two pivotally connected components, for instance, between a bed frame and a leg assembly pivotally connected to the bed frame.

Figure 2:
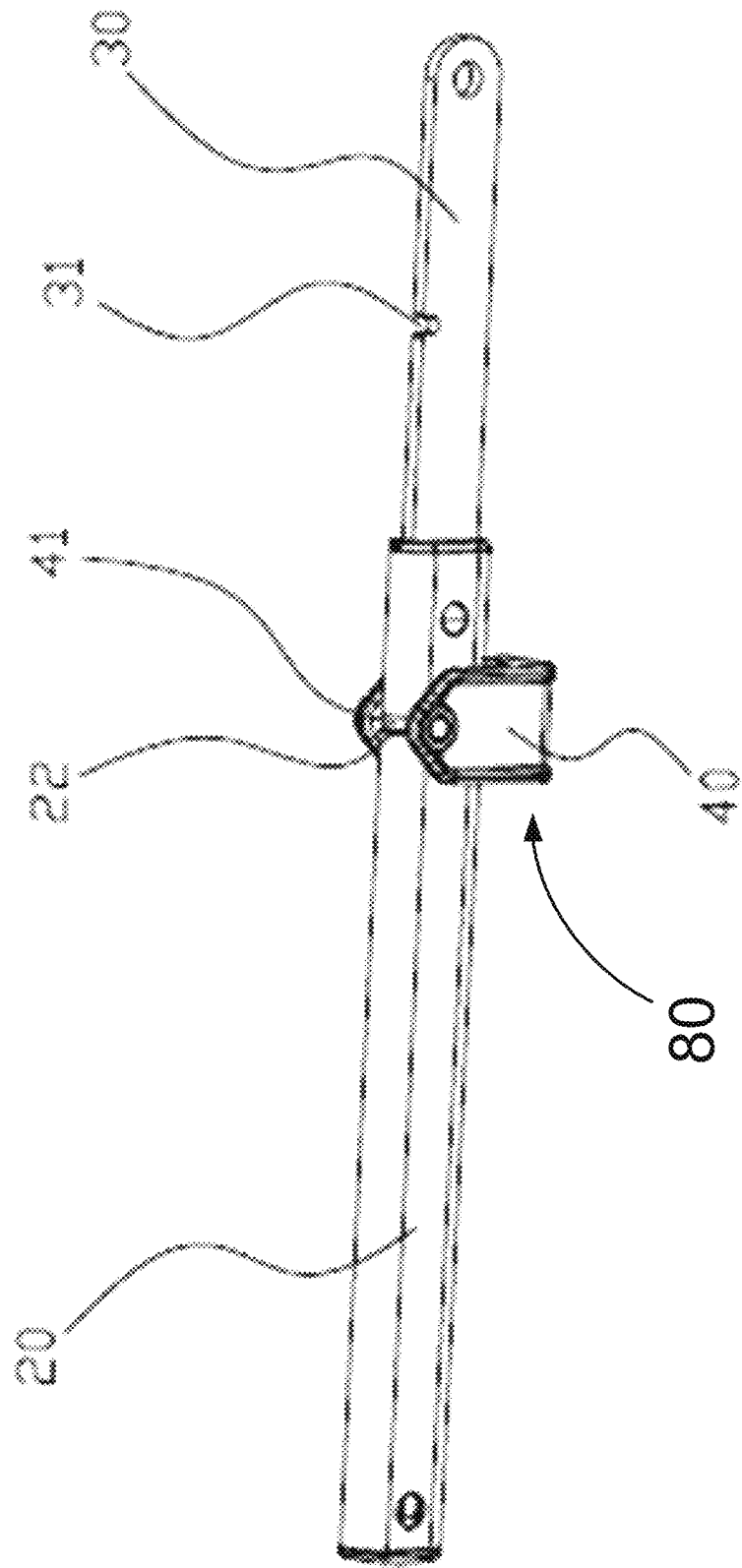
FIG. 2 is a schematic view illustrating an adjustable support in accordance with exemplary embodiments of the present invention.
Figure 3:
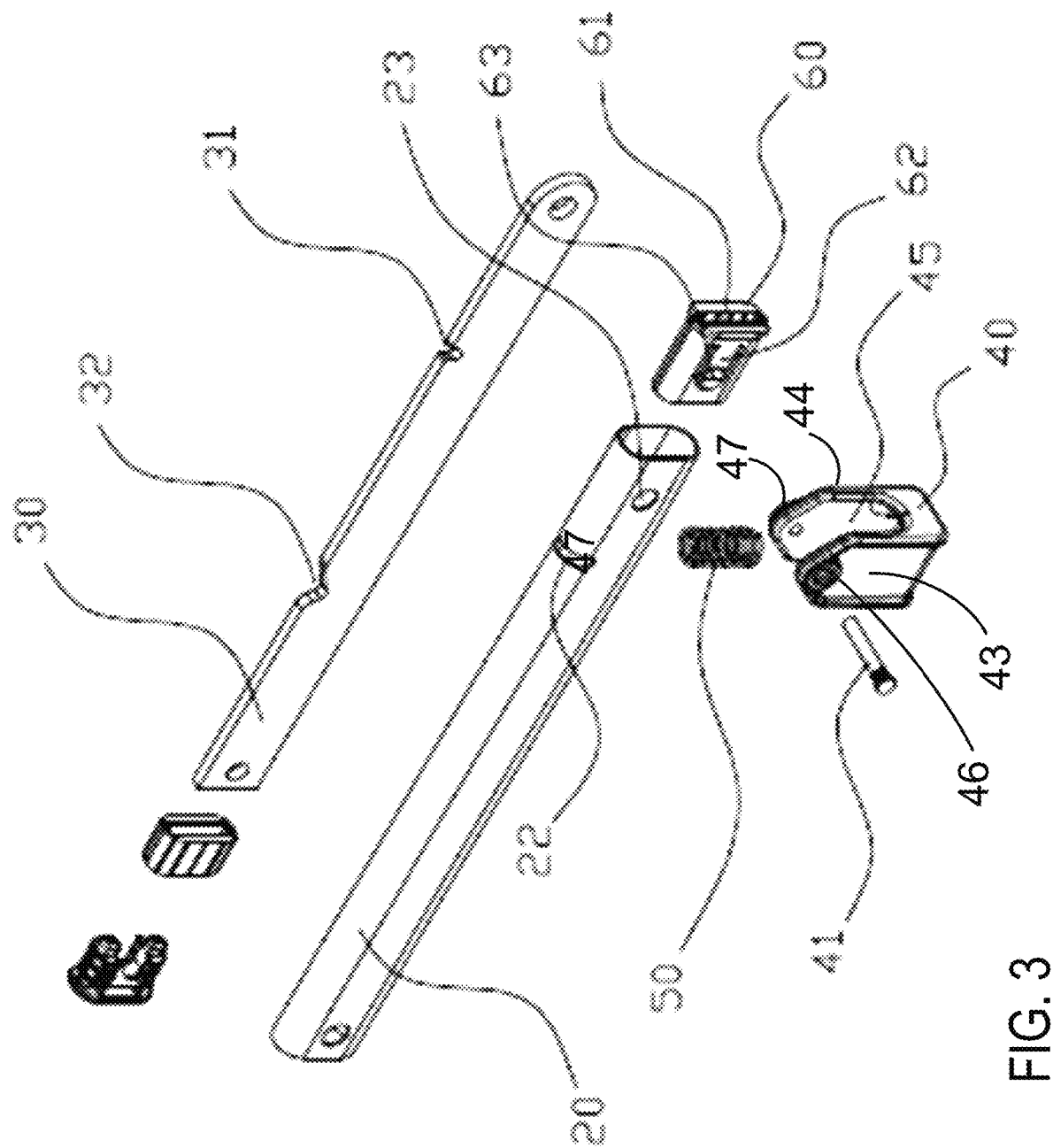
FIG. 3 is an exploded view illustrating the adjustable support of FIG. 2.
Figure 4:
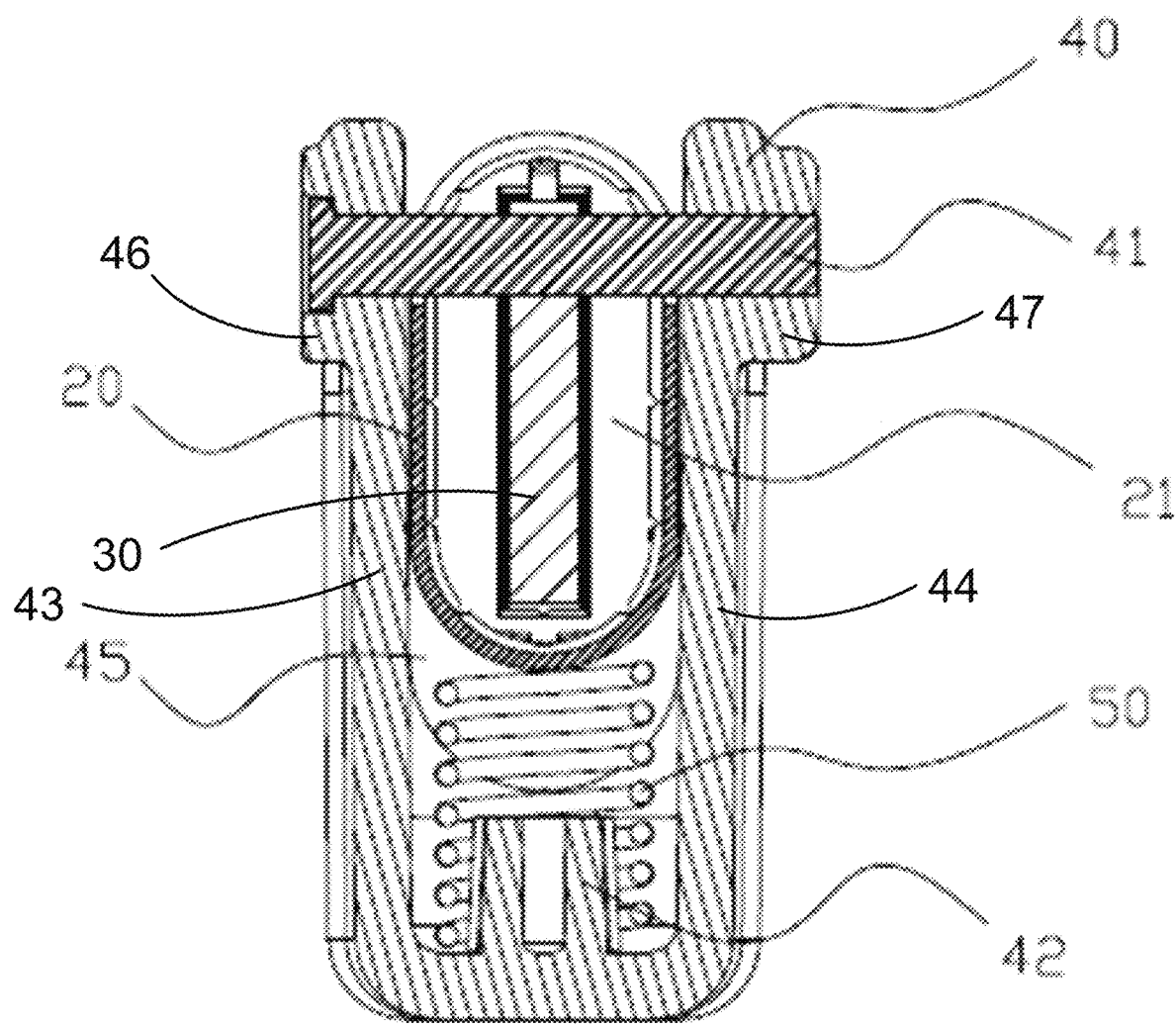
FIG. 4 is a cross-sectional view the adjustable support of FIG. 2 in a locked state in accordance with exemplary embodiments of the present invention.

Referring to FIGS. 2-4, there is depicted exemplary adjustable support 13 in accordance with various embodiments of the present invention. As shown, adjustable support 13 includes outer tubular bar 20, inner bar 30, locking/unlocking mechanism 80. As used herein, the term "tubular bar" refers to an elongated bar that is hollow along a portion or an entire length of the bar. The cross section of the tubular bar can be of any suitable shape (e.g., regular or irregular) including but not limited to oblong, oval, circular and polygonal. In an exemplary embodiment, the outer tubular bar has a substantially oblong cross section.

The outer tubular bar includes a first end (e.g., the left end in FIG. 3) and a second end (e.g., the right end in FIG. 3). The outer tubular bar also includes slot 22 between the first and second ends of the outer tubular bar to receive a fastener. The slot can be of any suitable configuration such as a cut with an opening on the peripheral wall of the outer tubular bar to receive a fastener, or two holes each on one side of the outer tubular bar to allow a fastener passing through, or the like. As an example, FIG. 3 illustrates slot 22 being a cut with an opening on the peripheral wall of the outer tubular bar.

The inner bar also includes a first end (e.g., the left end in FIG. 3), a second end (e.g., the right end in FIG. 3), and first cut 31 between the first and second ends of the inner bar. The first end of the inner bar is inserted into the outer tubular bar through the second end of the outer tubular bar. The inner bar is slidably coupled with the outer tubular bar such that the inner bar can move inwardly and outwardly along the longitudinal direction of the outer tubular bar. In an exemplary embodiment, the inner bar has a substantially rectangular cross section.

The locking/unlocking mechanism includes retainer 40, elastic member 50 and fastener 41. The retainer is formed with groove 45. The groove has an opening to receive the outer tubular bar. When assembled, a portion of the retainer adjacent the opening of the groove (e.g., the upper portion in FIG. 2) is aligned with the slot of the outer tubular bar. In some exemplary embodiments, the retainer has a substantially U-shape cross section. As shown in FIGS. 2-5, in the illustrated embodiment, the retainer includes a first side wall, such as first side wall 43, and a second side wall, such as second side wall 44. The groove is groove formed between the first and second side walls. The portion of the retainer adjacent the opening of the groove includes a first boss, such as first boss 46, and a second boss, such as second boss 47. The first boss is disposed at the first side wall and protruded outwardly from an exterior surface of the first side wall. The second boss is disposed at the second side wall and protruded outwardly from an exterior surface of the second side wall.

The elastic member is disposed at a bottom of the groove of the retainer. The elastic member abuts the outer tubular bar to push the outer tubular bar away from the retainer. In an exemplary embodiment, the elastic member is a spring. In some exemplary embodiments, the retainer includes protrusion 42 at the bottom of the groove to hold the elastic member. The protrusion can be a pillar, a post, a column, or the like.

Figure 5:
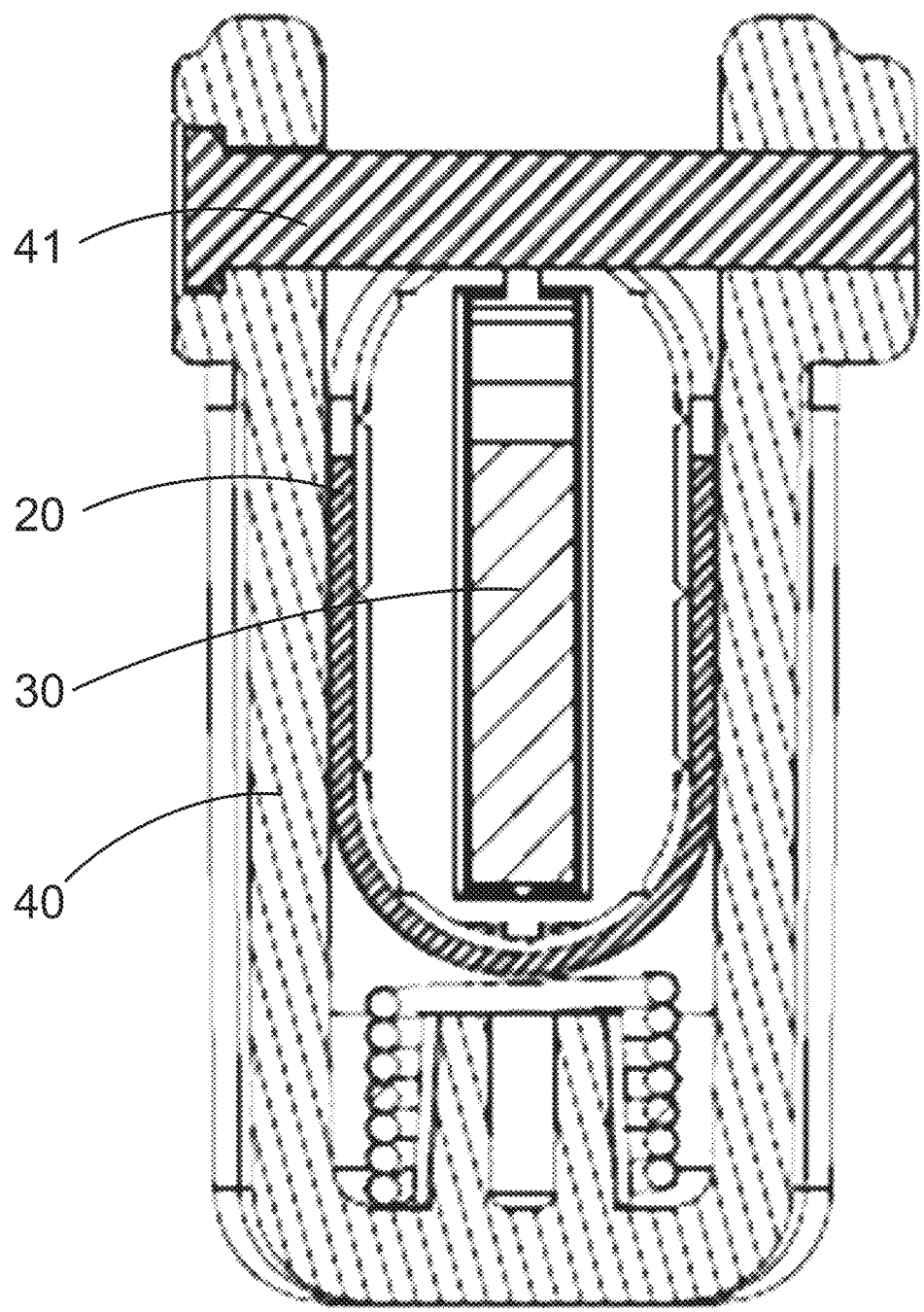
FIG. 5 is a cross-sectional view the adjustable support of FIG. 2 in an unlocked state in accordance with exemplary embodiments of the present invention.

The fastener is fixedly coupled with the portion of the retainer adjacent the opening of the groove. The fastener can be, but is not limited to a bolt, a pin, a latch, a shaft, a bar, or the like. As shown in FIGS. 2, 4 and 5, in the illustrated embodiment, a first end portion of the fastener is coupled with the first boss at the first side wall of the retainer and a second end portion of the fastener is coupled with the second boss at the second side wall of the retainer. When assembled, a stem portion of the fastener is disposed at the slot of the outer tubular bar and crosses the outer tubular bar. As such, when the first cut of the inner bar aligns with the slot of the outer tubular bar, the elastic member pushes the outer tubular bar along with the inner bar away from the retainer (e.g., upwardly in FIG. 4) so that the stem portion of the fastener seats at the first cut of the inner bar and the slot of the outer tubular bar. At this position, the fastener engages with both the slot of the outer tubular bar and the first cut of the inner bar, and thus restricts the inner bar and the outer tubular bar from moving with respect to each other.

The outer tubular bar can have any suitable length and the slot can be formed at any suitable position. In an exemplary embodiment, the slot of the outer tubular bar is formed at a position proximal to the second end of the outer tubular bar. Similarly, the inner bar can have any suitable length and the first slot can be formed at any suitable position. As such, the adjustable support of the present invention can be configured to be locked at any desired length. Moreover, the inner bar can be formed with two, three, four or more cuts. In such cases, the adjustable support of the present invention can be locked at various positions, providing a support with various fixed lengths.

For instance, in some exemplary embodiments, to have a second locked length, the inner bar includes second cut 32 formed between the first end and first cut 31 of the inner bar. The second cut can be configured the same as or different from the first cut in terms of the depth, width, slope or any other configuration characteristics. When the second cut of the inner bar aligns with the slot of the outer tubular bar, the elastic member pushes the outer tubular bar along with the inner bar away from the retainer (e.g., upwardly) so that the stem portion of the fastener seats at the second cut of the inner bar and the slot of the outer tubular bar. At this position, the fastener engages with both the slot of the outer tubular bar and the second cut of the inner bar, and thus restricts the inner bar and the outer tubular bar from moving with respect to each other. As such, the adjustable support can be locked at two different positions with two different lengths.

The locking/unlocking mechanism of the present invention is easy to unlock. Referring to FIG. 5, to unlock the locking/unlocking mechanism, push the retainer to compress the elastic member. Compression of the elastic member releases the fastener from the cut (e.g., the first, second or any cut) of the inner bar. Once the fastener is released, the inner and outer are movable with respect to each other.

The adjustable support of the present invention can include additional, optional, or alternative components. For instance, in some exemplary embodiments, an adjustable support further includes guide 60 coupled with the second end of the outer tubular bar. Guide 60 is configured to guide insertion of the inner bar into the outer tubular bar, movement of the inner bar with respect to the outer tubular bar, or both. In an exemplary embodiment, the guide includes opening 61 with a cross section shaped substantially the same as the cross section of the inner bar to assist the insertion and/or movement of the inner bar. In an exemplary embodiment, the guide includes one or more elastic pieces, each with a retention to fit with a hole formed at or adjacent the second end of the outer tubular bar. For instance, FIG. 3 illustrates guide 60 with elastic piece 62 (at one side or at each of two sides of the guide). Elastic piece 62 has retention 63 configured to couple (e.g., snap-fit) with hole 23 formed at or adjacent the second end of the outer tubular bar.

Figure 1:
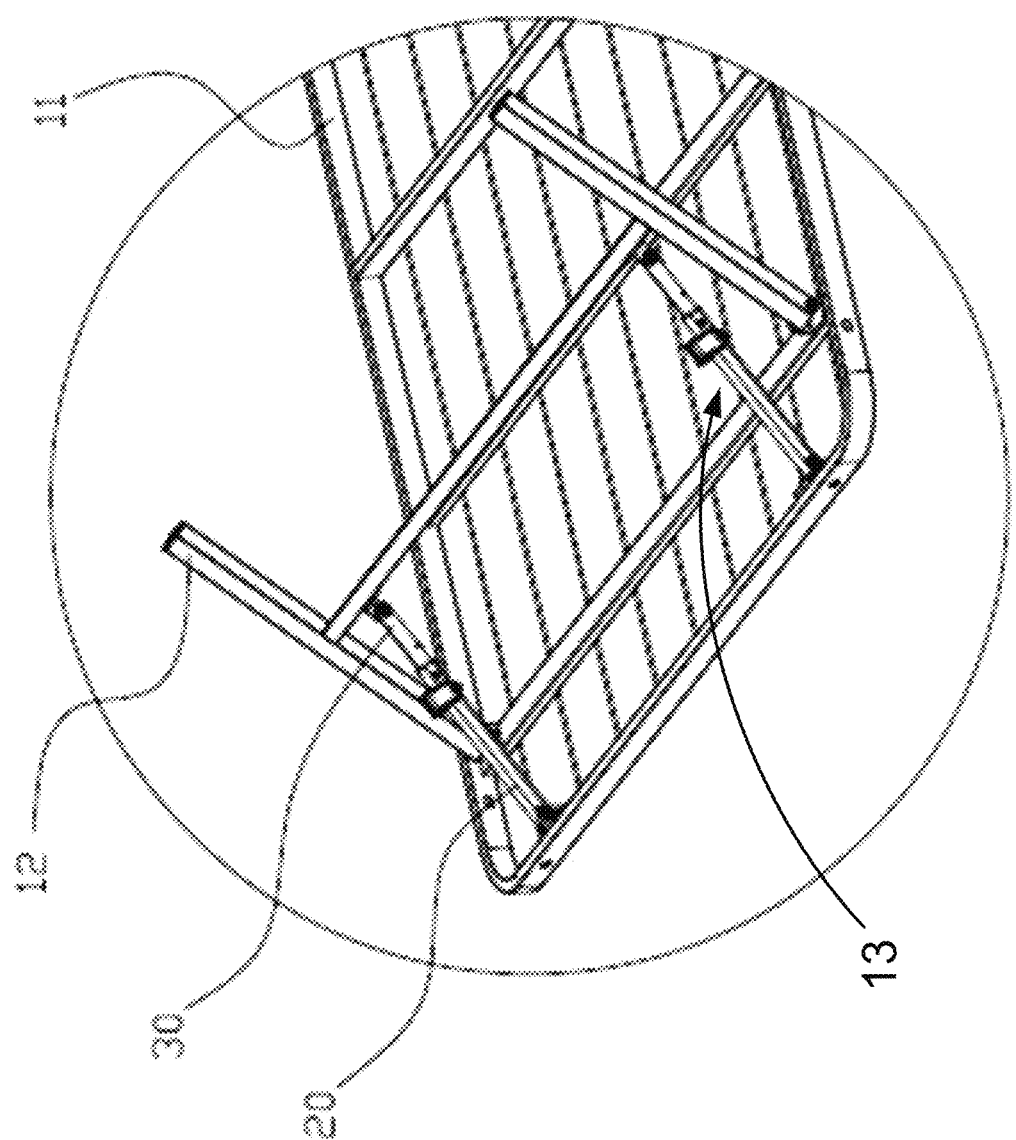
FIG. 1 is a schematic view illustrating a bedstead in accordance with exemplary embodiments of the present invention.

Adjustable supports of the present invention disclosed herein can be used in various applications. As an example, FIG. 1 illustrates the use of adjustable support(s) in a bedstead in accordance with some exemplary embodiments of the present invention. The bedstead can be of various sizes including, but not limited to, twin, full, queen and king sizes, and of various shapes including but not limited to rectangles and squares. A bedstead generally includes a bed frame and one or more leg assemblies coupled with the bed frame. The bed frame and the leg assembly can be made of various materials including, but not limited to, metals such as steel, plastics and woods. Also, the bed frame itself can be foldable or non-foldable.

In the illustrated embodiment, exemplary bedstead 100 includes bed frame 11 and leg assembly 12 pivotally connected with the bed frame. Bedstead 100 also includes one or more adjustable supports 13 of the present invention, each having one end pivotally connected with the bed frame and the other end pivotally connected with the leg assembly. Either the first end of the outer tubular bar or the second end of the inner bar can be connected with the bed frame or the leg assembly. In an exemplary embodiment, the first end of the outer tubular bar is pivotally connected with the bed frame, and the second end of the inner bar is pivotally connected with the leg assembly.

An adjustable support can be connected with any suitable component of the bed frame including but not limited to a peripheral frame, an interior bar or the like. Similarly, it can be connected with any suitable component of the leg assembly including but not limited to a leg, a lateral bar or the like. By way of example, FIG. 1 illustrates the adjustable support having one end connected with a peripheral frame of the bed frame and the other end connected with a lateral bar of the leg assembly.

In some exemplary embodiments, to lock the leg assembly when it is unfolded (e.g., when it is substantially perpendicular to the bed frame), the inner bar is formed with a first cut. When the first cut of the inner bar aligns with the slot of the outer tubular bar, the stem portion of the fastener seats at the first cut of the inner bar and the slot of the outer tubular bar. As such, it restricts the inner bar and the outer tubular bar from moving with respect to each other, and thus restricts the leg assembly and the bed frame from rotating with respect to each other. This enhances the stability of the bed frame. At this position, if folding the leg assembly is desired, push the retainer to compress the elastic member and thus release the fastener from the first cut of the inner bar as illustrated in FIG. 5. Once the fastener is released, the inner and outer are movable with respect to each other, allowing the leg assembly to fold with respect to the bed frame.

In some exemplary embodiments, the inner bar is also formed with a second cut between the first end and the first cut of the inner bar. When the second cut of the inner bar aligns with the slot of the outer tubular, the leg assembly is folded onto the bed frame. This helps to ensure the folded leg assembly would not be accidentally unfolded, for instance, during shipping, transportation or the like. At this position, if unfolding the leg assembly is desired, push the retainer to compress the elastic member and thus release the fastener from the second cut of the inner bar. Once the fastener is released, the inner and outer are movable with respect to each other, allowing the leg assembly to unfold with respect to the bed frame.

As disclosed herein, adjustable support 13 includes inner bar 20, outer tubular bar 30, and locking/unlocking mechanism 80. With these features, folding and unfolding the bed frame is simple and convenient. For example, to unfold the leg assembly, rotate the leg assembly away from the bed frame. As one end of the adjustable support is connected to the leg assembly and the other end of the adjustable support is connected to the bed frame, rotating the leg assembly causes the movement of the inner and outer bars with respect to each other. When the leg assembly is unfolded, the first cut of the inner bar and the slot of the outer tubular bar are aligned with each other. Aided by the elastic member, the outer tubular bar along with the inner bar is pushed away from the retainer, such that the fastener of the locking/unlocking mechanism seats at the first cut of the inner bar and the slot of the outer tubular bar. At this position, the fastener restricts the inner and outer bars from further movements, and thus helps to stabilize the bedstead when in use. To fold the leg assembly, push the retainer of the unlocking/unlocking mechanism to compress the elastic member and thus to releases the fastener from the first cut of the inner bar. Releasing the fastener from the first cut of the inner bar allows the inner and outer bars to move with respect to each other and thus allows the leg assembly to rotate toward and fold onto the bed frame.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will be understood that the terms "inner" or "outer", and etc. are used to describe features of the exemplary embodiments with reference to the positions of such features as displayed in the figures. It will be understood that, although the terms "first," "second," etc. may be used herein to describe various elements, these elements should not be limited by these terms. These terms are only used to distinguish one element from another. For example, a first cut could be termed a second cut, and, similarly, a second cut could be termed a first cut, without changing the meaning of the description, so long as all occurrences of the "first cut" are renamed consistently and all occurrences of the "second cut" are renamed consistently.

What is claimed is:

1. An adjustable support comprising:
   an outer tubular bar comprising a first end, a second end, and a slot between the first and second ends of the outer tubular bar;
   an inner bar slidably coupled with the outer tubular bar, the inner bar comprising a first end, a second end, and a first cut between the first and second ends of the inner bar, wherein the first end of the inner bar is inserted into the outer tubular bar through the second end of the outer tubular bar;
   a locking/unlocking mechanism comprising:
      a retainer comprising a first side wall, a second side wall and a groove formed between the first and second side walls with an opening to receive the outer tubular bar, wherein a portion of the retainer adjacent the opening of the groove is aligned with the slot of the outer tubular bar;
      an elastic member disposed at a bottom of the groove of the retainer, the elastic member abutting the outer tubular bar to push the outer tubular bar away from the retainer; and
      a fastener fixedly coupled with the portion of the retainer adjacent the opening of the groove, wherein a stem portion of the fastener is disposed at the slot of the outer tubular bar and crosses the outer tubular bar such that when the first cut of the inner bar aligns with the slot of the outer tubular bar, the stem portion of the fastener seats at the first cut of the inner bar and the slot of the outer tubular bar, thereby restricting the inner bar and the outer tubular bar from moving with respect to each other,
   wherein the portion of the retainer adjacent the opening of the groove comprises a first boss and a second boss, the first boss disposed at the first side wall and protruded outwardly from an exterior surface of the first side wall and the second boss disposed at the second side wall and protruded outwardly from an exterior surface of the second side wall,
   wherein a first end portion of the fastener is coupled with the first boss at the first side wall of the retainer and a second end portion of the fastener is coupled with the second boss at the second side wall of the retainer, and
   wherein the first boss enhances connection between the first end portion of the fastener and the first side wall of the retainer and the second boss enhances connection between the second end portion of the fastener and the second side wall of the retainer.

2. The adjustable support of claim 1, wherein the inner bar comprises a second cut between the first end and the first cut of the inner bar, wherein when the second cut of the inner bar aligns with the slot of the outer tubular, the stem portion of the fastener seats at the second cut of the inner bar and the slot of the outer tubular bar, thereby restricting the inner bar and the outer tubular bar from moving with respect to each other.

3. The adjustable support of claim 1, wherein the retainer has a substantially U-shape cross section.

4. The adjustable support of claim 1, wherein the outer tubular bar has a substantially oblong cross section, and the inner bar has a substantially rectangular cross section.

5. The adjustable support of claim 1, wherein the slot of the outer tubular bar is formed at a position proximal to the second end of the outer tubular bar.

6. The adjustable support of claim 1, wherein the fastener includes a bolt, a pin, a latch, a shaft, or a bar.

7. The adjustable support of claim 1, further comprising a guide coupled with the second end of the outer tubular bar to guide insertion of the inner bar into the outer tubular bar or movement of the inner bar with respect to the outer tubular bar.

8. The adjustable support of claim 7, wherein the guide comprises:
   an opening with a cross section shaped substantially the same as a cross section of the inner bar; and
   one or more elastic pieces, each with a retention to fit with a hole formed at or adjacent the second end of the outer tubular bar.

9. The bedstead of claim 1, wherein the retainer comprises a protrusion at a bottom of the retainer to hold the elastic member.

10. A bedstead comprising:
    a bed frame;
    a leg assembly pivotally connected with the bed frame; and
    one or more adjustable supports, each comprising:
       an outer tubular bar comprising a first end, a second end, and a slot between the first and second ends of the outer tubular bar;
       an inner bar slidably coupled with the outer tubular bar, the inner bar comprising a first end, a second end, and a first cut between the first and second ends of the inner bar, wherein the first end of the inner bar is inserted into the outer tubular bar through the second end of the outer tubular bar; and of the first end of the outer tubular bar and the second end of the inner bar, one is pivotally connected with the bed frame, and the other is pivotally connected with the leg assembly;

a locking/unlocking mechanism comprising:

a retainer comprising a first side wall, a second side wall and a groove formed between the first and second side walls with an opening to receive the outer tubular bar, wherein a portion of the retainer adjacent the opening of the groove is aligned with the slot of the outer tubular bar;

an elastic member disposed at a bottom of the groove of the retainer, the elastic member abutting the outer tubular bar to push the outer tubular bar away from the retainer; and a fastener fixedly coupled with the portion of the retainer adjacent the opening of the groove, wherein a stem portion of the fastener is disposed at the slot of the outer tubular bar and crosses the outer tubular bar such that when the first cut of the inner bar aligns with the slot of the outer tubular bar, the stem portion of the fastener seats at the first cut of the inner bar and the slot of the outer tubular bar, thereby restricting the inner bar and the outer tubular bar from moving with respect to each other and accordingly restricting the leg assembly and the bed frame from rotating with respect to each other, wherein the portion of the retainer adjacent the opening of the groove comprises a first boss and a second boss, the first boss disposed at the first side wall and protruded outwardly from an exterior surface of the first side wall and the second boss disposed at the second side wall and protruded outwardly from an exterior surface of the second side wall, wherein a first end portion of the fastener is coupled with the first boss at the first side wall of the retainer and a second end portion of the fastener is coupled with the second boss at the second side wall of the retainer, and wherein the first boss enhances connection between the first end portion of the fastener and the first side wall of the retainer and the second boss enhances connection between the second end portion of the fastener and the second side wall of the retainer.

11. The bedstead of claim 10, wherein the first end of the outer tubular bar is pivotally connected with the bed frame, and the second end of the inner bar is pivotally connected with the leg assembly.

12. The bedstead of claim 10, wherein when the first cut of the inner bar aligns with the slot of the outer tubular bar, the leg assembly is unfolded with respect to the bed frame.

13. The bedstead of claim 10, wherein the inner bar comprises a second cut between the first end and the first cut of the inner bar, wherein when the second cut of the inner bar aligns with the slot of the outer tubular bar, the stem portion of the fastener seats at the second cut of the inner bar and the slot of the outer tubular bar, thereby restricting the inner bar from moving with respect to the outer tubular bar and accordingly restricting the leg assembly from rotating with respect to the bed frame.

14. The bedstead of claim 13, wherein when the second cut of the inner bar aligns with the slot of the outer tubular bar, the leg assembly is folded onto the bed frame.

15. The bedstead of claim 10, wherein the outer tubular bar has a substantially oblong cross section, and the inner bar has a substantially rectangular cross section.

16. The bedstead of claim 10, wherein the slot of the outer tubular bar is proximal to the second end of the outer tubular bar.

17. The bedstead of claim 10, wherein the fastener includes a bolt, a pin, a latch, a shaft, or a bar.

18. The bedstead of claim 10, wherein each adjustable support further comprises a guide coupled with the second end of the outer tubular bar to guide insertion of the inner bar into the outer tubular bar or movement of the inner bar with respect to the outer tubular bar.

19. The bedstead of claim 18, wherein the guide comprises:

an opening with a cross section shaped substantially the same as a cross section of the inner bar; and one or more elastic pieces, each with a retention to fit with a hole formed at or adjacent the second end of the outer tubular bar.

20. The bedstead of claim 10, wherein the retainer comprises a protrusion at a bottom of the retainer to hold the elastic member.

* * * * *